US012783859B2

(12) United States Patent
Heshmati et al.

(10) Patent No.: US 12,783,859 B2
(45) Date of Patent: Nov. 3, 2026

(54) DOUBLE DESCENT FOR TIME SERIES FORECASTING

(71) Applicant: Robert Bosch GmbH, Stuttgart (DE)

(72) Inventors: Sam Heshmati, San Jose, CA (US); Burhaneddin Yaman, San Jose, CA (US); Valentino Assandri, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 608 days.

(21) Appl. No.: 18/366,089

(22) Filed: Aug. 7, 2023

(65) Prior Publication Data

US 2025/0053795 A1 Feb. 13, 2025

(51) Int. Cl.
*G06N 3/049* (2023.01)
*G06N 3/0455* (2023.01)
*G06N 3/08* (2023.01)

(52) U.S. Cl.
CPC ........... *G06N 3/049* (2013.01); *G06N 3/0455* (2023.01); *G06N 3/08* (2013.01)

(58) Field of Classification Search
CPC ......... G06N 3/09; G06N 20/00; G06F 18/214
See application file for complete search history.

(56) References Cited

U.S. PATENT DOCUMENTS

| | | | | |
|---|---|---|---|---|
| 2015/0127594 A1* | 5/2015 | Parada San Martin | .. | G06N 7/01 706/16 |
| 2017/0228645 A1* | 8/2017 | Wang | ..................... | G06N 3/084 |
| 2018/0232152 A1* | 8/2018 | Perez | ....................... | G06N 3/08 |

OTHER PUBLICATIONS

Zhou, Tian, et al. "Fedformer: Frequency enhanced decomposed transformer for long-term series forecasting." International conference on machine learning. PMLR, 2022. (Year: 2022).*
Nonlinear Time Series Prediction Using Chaotic Neural Networks, Li Ke-Ping and Chen Tian-Lun 2001 Commun. Theor. Phys. 35 759 (Year: 2001).*
Behera, Laxmidhar, Swagat Kumar, and Awhan Patnaik. "On adaptive learning rate that guarantees convergence in feedforward networks." IEEE transactions on neural networks 17.5 (2006): 1116-1125. (Year: 2006).*
Brown, Tom B. et al., "Language Models are Few-Shot Learners", 34th Conference on Neural Information Processing Systems (NeurIPS 2020), Vancouver, Canada.
Dosovitskiy, Alexey et al. "An image is worth 16x16 words: Transformers for Image Recognition at Scale", ICLR 2021, Jun. 3, 2021.

(Continued)

*Primary Examiner* — Schyler S Sanks
(74) *Attorney, Agent, or Firm* — Maginot, Moore & Beck LLP

(57) ABSTRACT

A "modern regime" training framework for deep learning-based time series forecasting models is described herein. In summary, the "modern regime" training framework consists of configuring the hyperparameters of the training process in a manner that substantially increases the complexity of the time series forecasting model beyond conventional norms and enables the time series forecasting model to achieve a "double descent" during the training process. In essence, a "double descent" has occurred when, after initially improving and reaching a local maximum performance, the performance of the time series forecasting model is allowed to deteriorate substantially and then improve again to reach a performance that exceeds the initial local maximum performance.

15 Claims, 4 Drawing Sheets

(56) References Cited

OTHER PUBLICATIONS

Nakkiran, Preetum et al., "Deep double descent: Where bigger models and more data hurt", Journal of Statistical Mechanics: Theory and Experiment, Dec. 29, 2021.
Noguer I Alonso, Dr Miquel et. al., "The Shape of Performance Curve in Financial Time Series", Artificial Intelligence in Finance Institute, NYU Courant Wright Research, Dec. 2021.
Zhou, Tian et al., "FEDformer: Frequency Enhanced Decomposed Transformer for Long-Term Series Forecasting", Proceedings of the 39th International Conference on Machine Learning, Baltimore, Maryland, USA, 2022.
Wu, Haixu et al., "Autoformer: Decomposition Transformers with Auto-Correlation for Long-Term Series Forecasting", 35th Conference on Neural Information Processing Systems (NeurIPS 2021).

* cited by examiner

| | | Double Descent | | | | | | Original | | | | | |
|---|---|---|---|---|---|---|---|---|---|---|---|---|---|
| | | FEDformer | | Autoformer | | Informer | | FEDformer | | Autoformer | | Informer | |
| | | MSE | MAE | MSE | MAE | MSE | MAE | MSE | MAE | MSE | MAE | MSE | MAE |
| ETTh1 | 96 | **0.376** | **0.413** | 0.436 | 0.448 | 0.933 | 0.764 | **0.376** | 0.419 | 0.449 | 0.459 | 0.865 | 0.713 |
| | 192 | 0.427 | 0.449 | 0.444 | 0.451 | 1.034 | 0.798 | **0.42** | **0.448** | 0.5 | 0.482 | 1.008 | 0.792 |
| | 336 | **0.448** | **0.462** | 0.516 | 0.493 | 1.098 | 0.819 | 0.459 | 0.465 | 0.521 | 0.496 | 1.107 | 0.809 |
| | 720 | **0.479** | **0.495** | 0.5 | 0.501 | 1.13 | 0.83 | 0.506 | 0.507 | 0.514 | 0.512 | 1.181 | 0.865 |
| ETTh2 | 96 | **0.34** | **0.384** | 0.419 | 0.433 | 2.992 | 1.365 | 0.346 | 0.388 | 0.358 | 0.397 | 3.755 | 1.525 |
| | 192 | 0.431 | 0.44 | 0.45 | 0.448 | 7.184 | 2.206 | **0.429** | **0.439** | 0.456 | 0.452 | 5.602 | 1.931 |
| | 336 | 0.503 | 0.495 | **0.477** | **0.48** | 5.662 | 1.926 | 0.496 | 0.487 | 0.482 | 0.486 | 4.721 | 1.835 |
| | 720 | 0.478 | 0.484 | 0.482 | 0.489 | 4.492 | 1.803 | **0.463** | **0.474** | 0.515 | 0.511 | 3.647 | 1.625 |
| ETTm1 | 96 | **0.364** | 0.413 | 0.389 | **0.412** | 0.624 | 0.559 | 0.379 | 0.419 | 0.505 | 0.475 | 0.672 | 0.571 |
| | 192 | **0.406** | **0.435** | 0.465 | 0.456 | 0.717 | 0.615 | 0.426 | 0.441 | 0.553 | 0.496 | 0.795 | 0.669 |
| | 336 | **0.443** | **0.457** | 0.605 | 0.512 | 0.835 | 0.673 | 0.445 | 0.459 | 0.621 | 0.537 | 1.212 | 0.871 |
| | 720 | **0.523** | 0.492 | 0.75 | 0.571 | 0.904 | 0.714 | 0.543 | **0.49** | 0.671 | 0.561 | 1.166 | 0.823 |
| ETTm2 | 96 | **0.189** | **0.282** | 0.244 | 0.317 | 0.409 | 0.48 | 0.203 | 0.287 | 0.255 | 0.339 | 0.365 | 0.453 |
| | 192 | **0.255** | **0.323** | 0.275 | 0.333 | 0.84 | 0.721 | 0.269 | 0.328 | 0.281 | 0.34 | 0.533 | 0.563 |
| | 336 | 0.327 | **0.365** | 0.336 | 0.37 | 1.44 | 0.921 | **0.325** | 0.366 | 0.339 | 0.372 | 1.363 | 0.887 |
| | 720 | 0.439 | 0.428 | 0.445 | 0.434 | 3.95 | 1.473 | **0.421** | **0.415** | 0.433 | 0.432 | 3.379 | 1.338 |
| Electricity | 96 | **0.188** | **0.304** | 0.201 | 0.315 | 0.333 | 0.412 | 0.193 | 0.308 | 0.201 | 0.317 | 0.274 | 0.368 |
| | 192 | **0.194** | **0.309** | 0.226 | 0.334 | 0.319 | 0.404 | 0.201 | 0.315 | 0.222 | 0.334 | 0.296 | 0.386 |
| | 336 | **0.211** | **0.324** | 0.219 | 0.331 | 0.327 | 0.409 | 0.214 | 0.329 | 0.231 | 0.338 | 0.3 | 0.394 |
| | 720 | 0.271 | 0.37 | 0.256 | 0.361 | 0.337 | 0.415 | **0.246** | **0.355** | 0.254 | 0.361 | 0.373 | 0.439 |
| Exchange | 96 | **0.125** | **0.254** | 0.179 | 0.31 | 0.903 | 0.787 | 0.148 | 0.278 | 0.197 | 0.323 | 0.847 | 0.752 |
| | 192 | **0.24** | **0.353** | 0.441 | 0.472 | 1.087 | 0.83 | 0.271 | 0.38 | 0.3 | 0.369 | 1.204 | 0.895 |
| | 336 | **0.402** | **0.465** | 1.08 | 0.778 | 1.44 | 0.986 | 0.46 | 0.5 | 0.509 | 0.524 | 1.672 | 1.036 |
| | 720 | 1.154 | 0.823 | **1.09** | **0.812** | 2.09 | 1.193 | 1.195 | 0.841 | 1.447 | 0.941 | 2.478 | 1.31 |
| Traffic | 96 | **0.578** | **0.358** | 0.63 | 0.402 | 0.718 | 0.399 | 0.587 | 0.366 | 0.613 | 0.388 | 0.719 | 0.391 |
| | 192 | 0.607 | 0.376 | 0.669 | 0.417 | 0.742 | 0.415 | **0.604** | **0.373** | 0.616 | 0.382 | 0.696 | 0.379 |
| | 336 | **0.619** | 0.38 | 0.703 | 0.436 | 0.775 | 0.429 | 0.621 | 0.383 | 0.622 | **0.337** | 0.777 | 0.42 |
| | 720 | 0.629 | **0.381** | 0.696 | 0.423 | 0.821 | 0.45 | **0.626** | 0.382 | 0.66 | 0.408 | 0.864 | 0.472 |
| Weather | 96 | 0.239 | 0.322 | 0.226 | 0.299 | 0.437 | 0.463 | **0.217** | **0.296** | 0.266 | 0.336 | 0.3 | 0.384 |
| | 192 | 0.284 | 0.342 | 0.317 | 0.381 | 0.508 | 0.499 | **0.276** | **0.336** | 0.307 | 0.367 | 0.598 | 0.544 |
| | 336 | 0.355 | 0.397 | 0.347 | 0.391 | 0.623 | 0.558 | **0.339** | **0.38** | 0.359 | 0.395 | 0.578 | 0.523 |
| | 720 | **0.392** | **0.406** | 0.449 | 0.45 | 0.982 | 0.75 | 0.403 | 0.428 | 0.419 | 0.428 | 1.059 | 0.741 |
| ILI | 24 | **2.628** | **1.06** | 3.563 | 1.259 | 5.246 | 1.585 | 3.228 | 1.26 | 3.483 | 1.287 | 5.764 | 1.677 |
| | 36 | **2.324** | **0.957** | 2.999 | 1.137 | 4.802 | 1.525 | 2.679 | 1.08 | 3.103 | 1.148 | 4.755 | 1.467 |
| | 48 | **2.31** | **0.98** | 3.082 | 1.163 | 5.041 | 1.562 | 2.622 | 1.078 | 2.669 | 1.085 | 4.763 | 1.469 |
| | 60 | **2.566** | **1.059** | 2.903 | 1.139 | 5.275 | 1.605 | 2.857 | 1.157 | 2.77 | 1.125 | 5.264 | 1.564 |

FIG. 4

DOUBLE DESCENT FOR TIME SERIES FORECASTING

FIELD

The device and method disclosed in this document relates to machine learning and, more particularly, to training a model for time series forecasting.

BACKGROUND

Unless otherwise indicated herein, the materials described in this section are not admitted to be the prior art by inclusion in this section.

Deep learning models, particularly Transformers, have achieved remarkable performance in numerous domains, including natural language processing (NLP), computer vision (CV), and time series forecasting. While existing research on time series forecasting has primarily focused on architectural modifications and data augmentations, recent advancements in the natural language processing space have demonstrated the significance of innovating the training schema of deep learning models, i.e., innovating on how a model is trained rather than how the model is constructed mathematically.

Traditionally, it was believed that as model complexity increases, a model becomes prone to overfitting, and as a result, generalization performance would degrade. This can be referred to as the "classical regime." However, Deep Double Descent, a recently re-popularized phenomenon in deep learning, challenges the conventional understanding of the relationship between model complexity, training epochs, and generalization performance. Particularly, the deep double descent phenomenon reveals a more nuanced pattern, where the generalization error first decreases, then increases, and then potentially decreases again as the model size and/or training epochs grow. The epoch-wise deep double descent phenomenon suggests that extending the training process can lead to improved generalization performance, even after a model has seemingly started to overfit the training dataset. This highlights the importance of revisiting the conventional understanding of generalization in deep learning and encourages further research into the role of model size, training epochs, and implicit regularization in improving the performance of deep learning models.

The deep double descent phenomenon has been the foundation of many innovations in the NLP and CV fields and can be attributed as a key factor of the trend of ever larger models. Training frameworks that are based on the double descent theory can be referred to as "modern regimes." However, a "modern regime" has not been designed and applied to time series forecasting.

SUMMARY

A method for training a deep learning-based time series forecasting model is described. The method comprises storing, in a memory, (i) a training dataset including a first plurality of time series data and (ii) a testing dataset including a second plurality of time series data. The method further comprises training, with a processor, the time series forecasting model using the training dataset. The time series forecasting model has a plurality of parameters that are learned during the training. The method further comprises periodically during the training, with the processor, evaluating a performance of the time series forecasting model against the testing dataset. The training proceeds for a sufficient number of training epochs that, after initially improving and reaching a local maximum performance, the performance of the time series forecasting model is allowed to deteriorate and then improve again to reach a performance that exceeds the local maximum performance.

A non-transitory computer-readable medium that stores program instructions for training a deep learning-based time series forecasting model is disclosed. The program instructions, when executed by a processor, cause the processor to receive (i) a training dataset including a first plurality of time series data and (ii) a testing dataset including a second plurality of time series data. The program instructions, when executed by a processor, further cause the processor to train the time series forecasting model using the training dataset. The time series forecasting model has a plurality of parameters that are learned during the training. The program instructions, when executed by a processor, further cause the processor to periodically during the training, evaluate a performance of the time series forecasting model against the testing dataset. The training proceeds for a sufficient number of training epochs that, after initially improving and reaching a local maximum performance, the performance of the time series forecasting model is allowed to deteriorate and then improve again to reach a performance that exceeds the local maximum performance.

A system for training a deep learning-based time series forecasting model is disclosed. The system comprises a memory configured to store (i) a training dataset including a first plurality of time series data and (ii) a testing dataset including a second plurality of time series data. The system further comprises a processor. The processor is configured to train the time series forecasting model using the training dataset. The time series forecasting model has a plurality of parameters that are learned during the training.

The processor is further configured to, periodically during the training, evaluate a performance of the time series forecasting model against the testing dataset. The training proceeds for a sufficient number of training epochs that, after initially improving and reaching a local maximum performance, the performance of the time series forecasting model is allowed to deteriorate and then improve again to reach a performance that exceeds the local maximum performance.

BRIEF DESCRIPTION OF THE DRAWINGS

The foregoing aspects and other features of methods and systems are explained in the following description, taken in connection with the accompanying drawings.

FIG. 4 shows a table comparing the results of applying the "modern regime" training framework with results of applying the original training frameworks.

DETAILED DESCRIPTION

Figure 1:
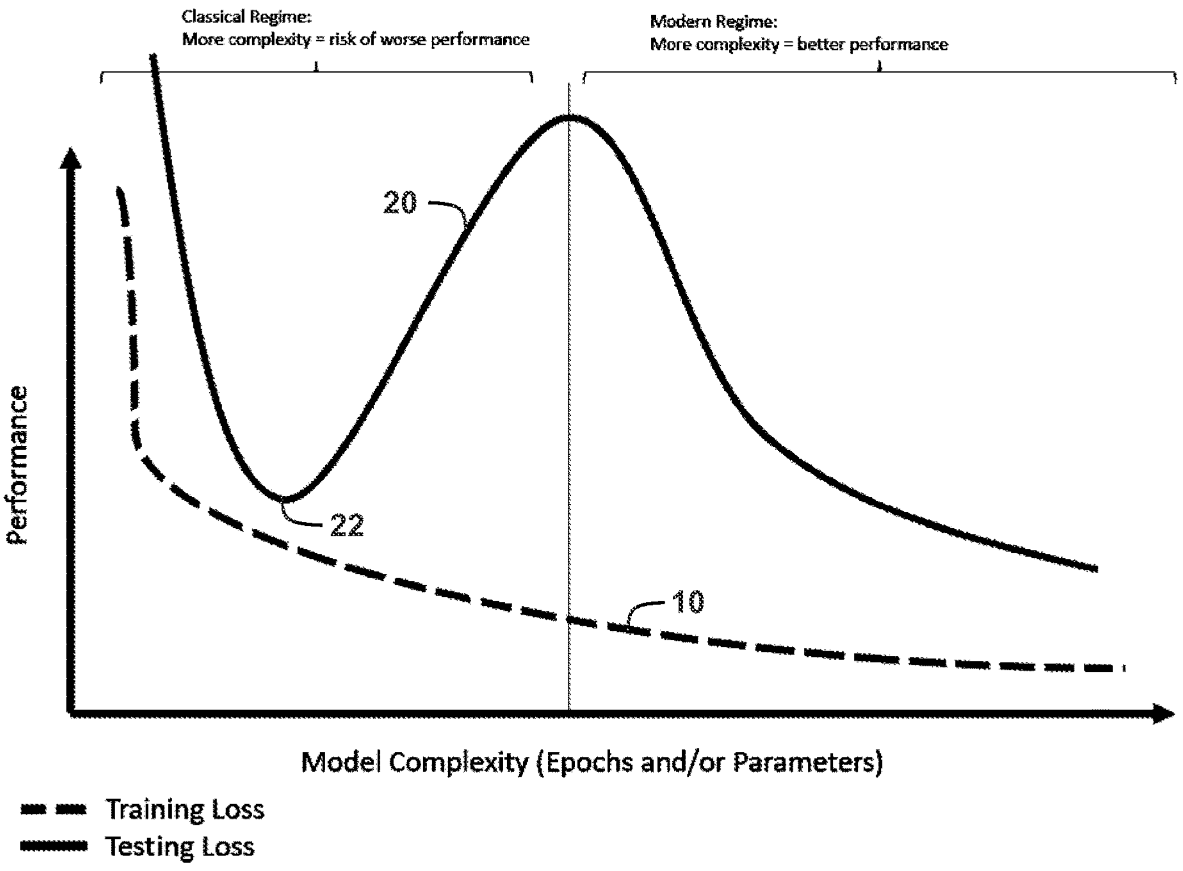
FIG. 1 is a plot showing model performance in training and testing as a function of model complexity.

For the purposes of promoting an understanding of the principles of the disclosure, reference will now be made to the embodiments illustrated in the drawings and described in the following written specification. It is understood that no limitation to the scope of the disclosure is thereby intended.

It is further understood that the present disclosure includes any alterations and modifications to the illustrated embodiments and includes further applications of the principles of the disclosure as would normally occur to one skilled in the art which this disclosure pertains.

Overview

A "modern regime" training framework for deep learning-based time series forecasting models is described herein. It should be appreciated that, based on the double decent theory, current state-of-the-art models for time series forecasting are undertrained and, as a result, may lead to suboptimal time series forecasting. In order to tackle this issue, the training framework described herein advantageously applies a "modern regime" to time series forecasting and is shown to increase the performance of time series forecasting models.

A time series forecasting model 30 to which the "modern regime" training framework is applied may adopt any of a variety of deep-learning based model architectures. In some embodiments, the time series forecasting model is a Transformer-based time series forecasting model. It will be appreciated by those of ordinary skill that time forecasting models have a wide variety of useful applications in a wide variety of domains, such as in sales and marketing, demand prediction, electricity consumption forecasting, etc.

In summary, the "modern regime" training framework consists of configuring the hyperparameters of the training process in a manner that substantially increases the complexity of the time series forecasting model 30 beyond conventional norms and enables the time series forecasting model 30 to achieve a "double descent" during the training process. In essence, a "double descent" has occurred when, after initially improving and reaching a local maximum performance, the performance of the time series forecasting model 30 is allowed to deteriorate substantially and then improve again to reach a performance that exceeds the initial local maximum performance.

Most importantly, the complexity of the time series forecasting model 30 must be increased by a large factor. The value of this factor may be acquired through experimentation and depends on the specific time series forecasting model that is used, the intended application of the model, and statistical properties of the time series data used to train the model. Model complexity is primarily a function of the number of learnable parameters in the model and a number of training epochs used during training. However, even when the number of learnable parameters and the maximum number of training epochs are set sufficiently high, it is not guaranteed that the time series forecasting model 30 will achieve the requisite complexity for "double descent." Particularly, other hyperparameters and features of the training strategy may stop the training process too early or otherwise prevent the "double descent" from occurring at all. To this end, other hyperparameters must be adjusted as necessary to allow the time series forecasting model 30 will achieve the requisite complexity. In at least some embodiments, the patience of the model 30, i.e., how long the training continues after the performance stops improving, is increased to a much higher level than would be conventionally used. In at least some embodiments, the learning rate decay strategy is changed to a custom decay strategy that exponentially decays the learning rate until it hits a predefined minimum value and then stays constant, where the predefined minimum value higher than would be conventionally used. Making these changes allows the time series forecasting model 30 to obtain the requisite complexity and achieve a "double descent" during the training process, and provide improved performance.

FIG. 1 is a plot showing model performance in training and testing as a function of model complexity, which illustrates the "double descent" phenomenon. Particularly, a training loss curve 10 illustrates a training loss as a function of model complexity and a testing loss curve 20 illustrates a testing loss as a function of model complexity. As can be seen, as the model complexity increases, the training loss continues to decrease, normally with diminishing returns. However, the testing loss does not follow the same pattern as the training loss. Instead, the testing loss initially decreases alongside the training loss as the model initially "learns" the general patterns in the data. However, these improvements plateau though as the model starts to overfit the training data. When overfitting occurs, the training loss keeps on decreasing but the testing loss starts increasing. This is because, at this stage, the model begins learning the random errors/patterns in the training data that are not indicative of how the model should behave in general.

In the classical regime, model complexity would be constrained so as to avoid this divergence between the training loss and the testing loss resulting from overfitting of the model to the training dataset. However, the "double descent" phenomenon can be observed when the model complexity is even further increased. Particularly, as model complexity increases, this process of divergence between the training loss and the testing loss continues until the model complexity reaches some inflection point, at which point it reverses and the model can be considered to exit the "classical" regime and transition into the "modern" regime. After this inflection point, further increases to model complexity cause the testing loss to decease again. At least in some cases, further increases in model complexity can cause the testing loss to eventually drop below the best performance achieved in the "classical" regime. When this occurs, the model has exploited the "double descent" phenomenon.

It has been shown experimentally that, compared to state-of-the-art models being trained using a "classical" regime training framework, the "modern regime" training framework described herein leads to improved results in a majority of the standard benchmarks for long time series forecasting. This "modern regime" training framework enables models to overcome the suboptimal results that they were delivering beforehand and set new benchmarks for the field of long time series forecasting.

FIG. 4 shows a table comparing the results of applying the "modern regime" training framework with results of applying the original training frameworks. The results listed in the table were determined using a variety of existing models, including such as FEDformer, Autoformer, and Informer, and using the several existing datasets (ILI, Weather, Traffic, Exchange, Electricity, ETTm2, ETTm1, ETTh2, and ETTh1). In the left-hand portion of the table, results are listed for standard benchmarking when a subset of the models were trained using the "modern regime" training framework described herein. In the right-hand portion of the table, results are listed for the same benchmarking metrics when the models were trained using their original or conventional "classical" regime training frameworks. As can be seen, in each case, applying the "modern regime" training framework can provide considerable performance increases compared to classical" regime training frameworks, and yields significant improvements in the field of time series forecasting.

Exemplary Hardware Embodiment

Figure 2:
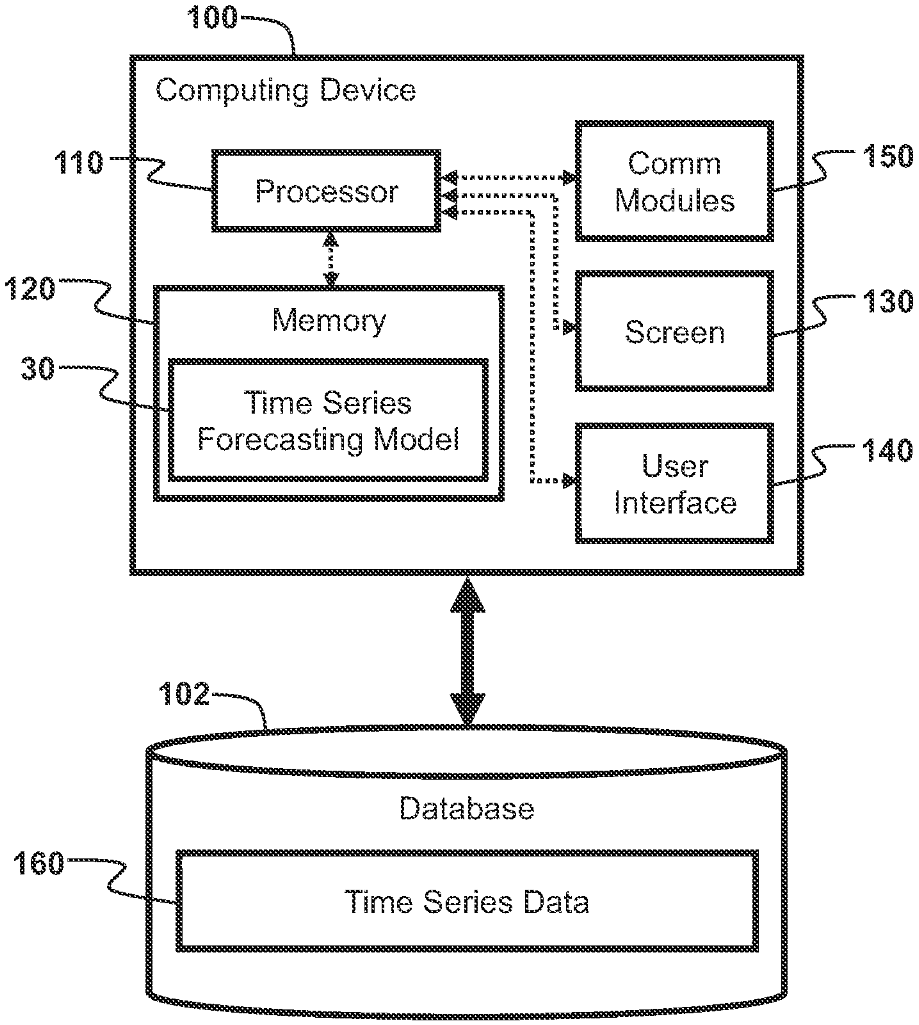
FIG. 2 shows an exemplary embodiment of the computing device that can be used to train the time series forecasting model.

FIG. 2 shows an exemplary embodiment of the computing device 100 that can be used to train the time series forecasting model 30 to perform a time series forecasting task. Likewise, the computing device 100 may be used to operate a previously trained time series forecasting model 30 to perform the time series forecasting task. The computing device 100 comprises a processor 110, a memory 120, a display screen 130, a user interface 140, and at least one network communications module 150. It will be appreciated that the illustrated embodiment of the computing device 100 is only one exemplary embodiment is merely representative of any of various manners or configurations of a server, a desktop computer, a laptop computer, mobile phone, tablet computer, or any other computing devices that are operative in the manner set forth herein. In at some embodiments, the computing device 100 is in communication with a database 102, which may be hosted by another device or which is stored in the memory 120 of the computing device 100 itself.

The processor 110 is configured to execute instructions to operate the computing device 100 to enable the features, functionality, characteristics and/or the like as described herein. To this end, the processor 110 is operably connected to the memory 120, the display screen 130, and the network communications module 150. The processor 110 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 110 may include a system with a central processing unit, graphics processing units, multiple processing units, dedicated circuitry for achieving functionality, programmable logic, or other processing systems.

The memory 120 is configured to store data and program instructions that, when executed by the processor 110, enable the computing device 100 to perform various operations described herein. The memory 120 may be of any type of device capable of storing information accessible by the processor 110, such as a memory card, ROM, RAM, hard drives, discs, flash memory, or any of various other computer-readable medium serving as data storage devices, as will be recognized by those of ordinary skill in the art.

The display screen 130 may comprise any of various known types of displays, such as LCD or OLED screens, configured to display graphical user interfaces. The user interface 140 may include a variety of interfaces for operating the computing device 100, such as buttons, switches, a keyboard or other keypad, speakers, and a microphone. Alternatively, or in addition, the display screen 130 may comprise a touch screen configured to receive touch inputs from a user.

The network communications module 150 may comprise one or more transceivers, modems, processors, memories, oscillators, antennas, or other hardware conventionally included in a communications module to enable communications with various other devices. Particularly, the network communications module 150 generally includes an ethernet adaptor or a Wi-Fi® module configured to enable communication with a wired or wireless network and/or router (not shown) configured to enable communication with various other devices. Additionally, the network communications module 150 may include a Bluetooth® module (not shown), as well as one or more cellular modems configured to communicate with wireless telephony networks.

In at least some embodiments, the memory 120 stores program instructions of the time series forecasting model 30 that, once the training is performed, are configured to perform a time series forecasting task. In at least some embodiments, the database 102 stores a plurality of time series data for training and testing the time series forecasting model.

Method of Training a Time Series Forecasting Model

A variety of operations and processes are described below for operating the computing device 100 to develop and train a time series forecasting model 30 to perform a time series forecasting task. In these descriptions, statements that a method, processor, and/or system is performing some task or function refers to a controller or processor (e.g., the processor 110 of the computing device 100) executing programmed instructions stored in non-transitory computer readable storage media (e.g., the memory 120 of the computing device 100) operatively connected to the controller or processor to manipulate data or to operate one or more components in the computing device 100 or of the database 102 to perform the task or function. Additionally, the steps of the methods may be performed in any feasible chronological order, regardless of the order shown in the figures or the order in which the steps are described.

Figure 3:
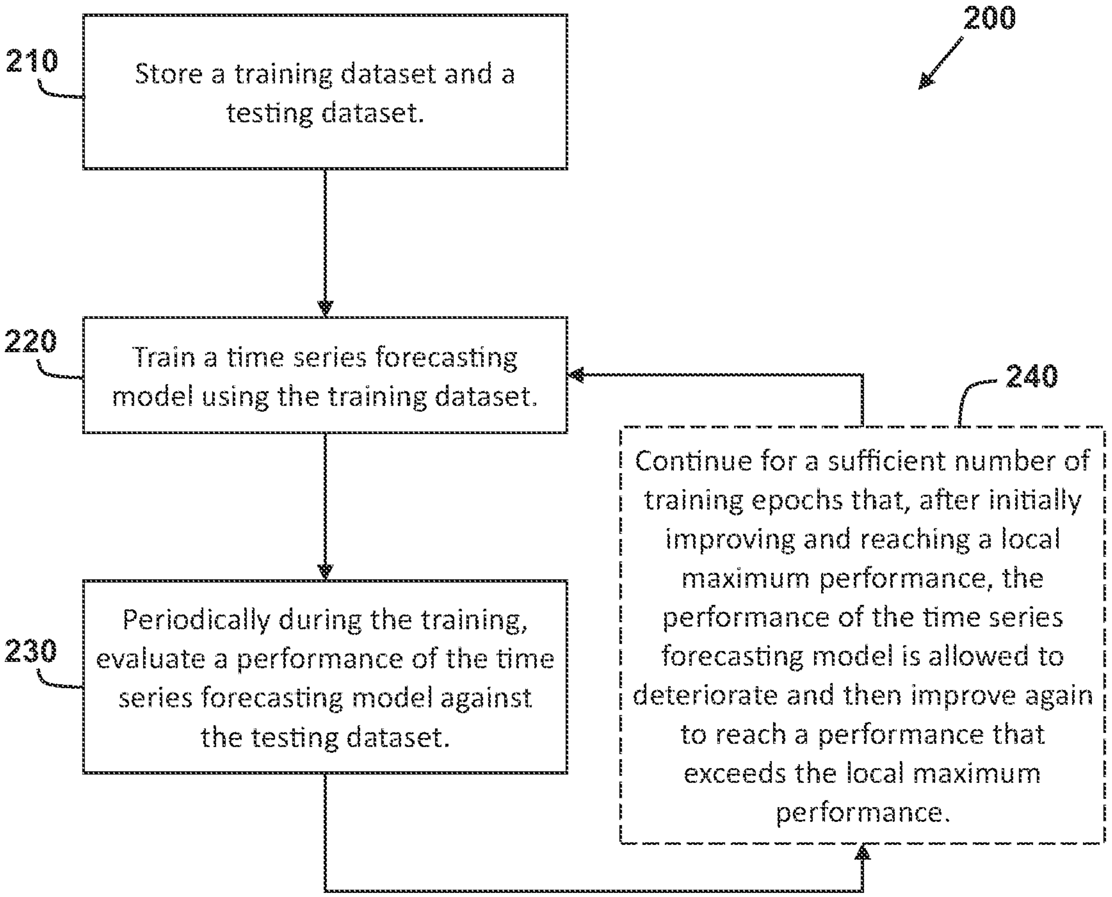
FIG. 3 shows a flow diagram for a method for training the time series forecast using a "modern regime" training framework.

FIG. 3 shows a flow diagram for a method 200 for training the time series forecast using a "modern regime" training framework. The method 200 advantageously enables to the performance of the time series forecasting model 30 to exceed the local maximum performance achieved under "classical regime" training frameworks. Particularly, the method 200 continues training the time series forecasting model 30 in spite of a tendency of the model the begin to overfit the training data after initially reaching the local maximum performance. The method 200 enables a time series forecasting model 30 with sufficient complexity to get past this overfitting phase and eventually achieve a performance that exceeds the initial local maximum performance provided by a "classical regime" training framework.

The method 200 begins with storing a training dataset and a testing dataset (block 210). Particularly, the processor 110 receives and/or the database 102 stores a training dataset comprising a first plurality of time series training data samples and a testing dataset comprising a second plurality of time series training data samples. Each sample in the training and testing datasets includes (i) input time series data and (ii) output time series that are subsequent in time compared to the input time series data. The time series data may comprise a variety of different types of timestamped data in which sequential times are associated with one or more values (e.g., of a measured or observed quantity). Moreover, it should be appreciated that the method 200 is predominantly agnostic to the particular domain of the time series data.

The method 200 continues with training the time series forecasting model using the training dataset (block 220). Particularly, the processor 110 trains the time series forecasting model 30, using the training dataset, to predict future time series data based on an input sequence of time series data. The time series forecasting model 30 may comprise any model having a plurality of learnable parameters and which is configured to or is trainable to receive a past values of a time series as input and determine predicted future values of the respective time series as output. In at least some embodiments, the time series forecasting model 30 is an artificial neural network. Such a neural network may, for example, have a Transformer-based architecture.

The processor 110 trains the time series forecasting model 30 over the course of a plurality of training epochs. Each training epoch comprises a plurality of iterations or batches. For each iteration or batch, the processor 110 determines one or more output(s) of the time series forecasting model 30 by providing input time series from one or more training sample(s) in the training dataset as input to the time series forecasting model 30. The processor 110 determines a training loss based on a comparison of the one or more output(s) with respective output time series of the one or more training sample(s). The processor 110 refines and/or updates the plurality of learnable parameters of the time series forecasting model 30 based on the determined training loss (e.g., using stochastic gradient descent or the like). This iterative training process is repeated for each of the plurality of iterations or batches until the time series forecasting model 30 has seen all or substantially all of the training dataset, thereby concluding a training epoch. The iterative training process is then repeated for the plurality of training epochs.

In at least some embodiments, the processor 110 trains the time series forecasting model 30 with a decaying learning rate strategy. Particularly, each time parameters of the time series forecasting model 30 are refined and/or updated, the refinements and/or updates to the parameters are scaled or otherwise adjusted by a learning rate (e.g., a number between 0 and 1). Thus, the processor 110 refines and/or updates parameters of the time series forecasting model 30 based on both the training loss and the current learning rate. The learning rate decays as the training progresses, e.g., as a function of the current training epoch. In at least one embodiment, the learning rate decays from an initial learning rate, as a function of the current training epoch, until a predefined minimum learning rate is reached and then stays constant at the predefined minimum learning rate after the predefined minimum learning rate is reached.

The method 200 continues with, periodically during the training, evaluating a performance of the time series forecasting model against the testing dataset (block 230). Particularly, periodically during the training, the processor 110 evaluates a performance of the time series forecasting model 30 against the testing dataset. To do so, the processor 110 determines one or more output(s) of the time series forecasting model 30 by providing input time series from one or more testing sample(s) in the testing dataset as input to the time series forecasting model 30. The processor 110 determines a testing loss based a comparison of the one or more output(s) with respective output time series of the one or more testing sample(s). In general, a relatively small value for the testing loss indicates relatively high or good performance and, likewise, a relatively large value for the testing loss indicates relatively low or poor performance.

The training and evaluation in the method 200 continue for a sufficient number of training epochs that, after initially improving and reaching a local maximum performance, the performance of the time series forecasting model is allowed to deteriorate and then improve again to reach a performance that exceeds the local maximum performance (block 240). Particularly, the processor 110 continues to train, and periodically evaluate the performance of, the time series forecasting model 30 for a sufficient number of training epochs that, after initially improving and reaching a local maximum performance, the performance of the time series forecasting model 30 is allowed to deteriorate and then improve again to reach a performance that exceeds the local maximum performance. In other words, the processor 110 continues to train the time series forecasting model 30 until the performance achieves a "double descent." In at least some embodiments, the performance of the time series forecasting model 30 must be allowed to deteriorate by at least a predetermined amount and then improve again to reach a performance that exceeds the local maximum performance, i.e., only a very minor deterioration and subsequent improvement is not sufficient to qualify as a "double descent."

With reference again to FIG. 1, as an example, as the processor 110 begins training the time series forecasting model 30, the training loss and testing loss initially fall together as the number of training epochs increases, and a local minimum testing loss 22 (representing local maximum performance) is reached. However, as the processor 110 continues to train the time series forecasting model 30, the testing loss increases substantially (representing a substantial deterioration in performance) as the number of training epochs increases. This divergence of the testing loss from the training loss is indicative of an overfitting of the time series forecasting model 30 to the training dataset and, thus, this phase of the training may be referred to herein as an "initial overfitting phase." As the processor 110 continues to train the time series forecasting model 30, after a sufficient number of training epochs, the testing loss falls again (representing an improvement in performance) and eventually falls below the initial local minimum testing loss 22 (or exceeds the initial local maximum performance), thereby achieving a "double descent."

It should be appreciated that various hyperparameters of the training process must be configured appropriately to enable this process of "double descent" to occur during training. Most importantly, the complexity of the time series forecasting model 30 must be increased to a sufficient complexity. As discussed above, model complexity is primarily a function of the number of learnable parameters in the model and a number of training epochs used during training. Thus, the processor 110 sets (i) the number of learnable parameters of the time series forecasting model 30 and (ii) the maximum number of training epochs of the training sufficiently high so as to enable the performance of the time series forecasting model 30 to deteriorate and then improve again after reaching the local maximum performance, i.e., achieve a "double descent." In at least some embodiments, the processor 110 sets the number of learnable parameters and the maximum number of training epochs based on user inputs received via the user interface 140.

However, even when the number of learnable parameters and the maximum number of training epochs are set sufficiently high, it is not guaranteed that the time series forecasting model 30 will achieve the requisite complexity for "double descent." Particularly, other hyperparameters and features of the training process may stop the training process too early or otherwise prevent the "double descent" from occurring at all.

As discussed above, in some embodiments, a decaying learning rate strategy is adopted, in which each time that parameters of the time series forecasting model 30 are refined and/or updated, the refinements and/or updates to the parameters are scaled or otherwise adjusted by a learning rate. In some embodiments, the learning rate decays from an initial learning rate as a function of the current training epoch until a predefined minimum learning rate is reached and stays constant at the predefined minimum learning rate after the predefined minimum learning rate is reached.

If the predefined minimum learning rate is set too low, it may prevent the performance of the time series forecasting model 30 from ever deteriorating after reaching the initial local maximum performance, thereby preventing the "double descent" from occurring at all. Thus, the processor 110 sets the predefined minimum learning rate sufficiently high so as to enable the performance of the time series forecasting model to deteriorate and then improve again after reaching the local maximum performance. In at least some embodiments, the processor 110 sets the predefined minimum learning rate based on user inputs received via the user interface 140.

In some training embodiments, a "patience" strategy is adopted, in which the processor 110 ends the training in response to a performance of the time series forecasting model 30 not improving for a predetermined number of epochs. If the predetermined number of epochs or "patience" is set too low, it may prevent the performance of the time series forecasting model 30 from ever deteriorating after reaching the initial local maximum performance, thereby preventing the "double descent" from occurring at all.

Thus, at least in some embodiments, the processor 110 sets the predetermined number of epochs or "patience" sufficiently high so as to enable the performance of the time series forecasting model to deteriorate and then improve again after reaching the local maximum performance. In at least some embodiments, the processor 110 sets the predefined minimum learning rate based on user inputs received via the user interface 140.

Alternatively, or in addition, in some embodiments, the processor 110 prevents the training process from ending on the basis of the "patience" strategy until time series forecasting model 30 has been allowed to deteriorate and then improve again after reaching the local maximum performance. In other words, the processor 110 ends the training in response to the performance of the time series forecasting model 30 not improving for a predetermined number of epochs, only after the performance of the time series forecasting model 30 has been allowed to deteriorate and then improve again after reaching the local maximum performance, i.e., achieve a "double descent." If the "double descent" has not yet occurred, then processor 110 prevents the training process from being ended, even if the performance of the time series forecasting model 30 has not improved for the predetermined number of epochs.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for training a deep learning-based time series forecasting model, the method comprising:

storing, in a memory, (i) a training dataset including a first plurality of time series data and (ii) a testing dataset including a second plurality of time series data;

training, with a processor, the time series forecasting model using the training dataset, the training taking place over multiple training epochs, the time series forecasting model having a plurality of parameters that are learned during the training;

periodically during the training, with the processor, evaluating a performance of the time series forecasting model against the testing dataset; and ending the training in response to the performance of the time series forecasting model not improving for a predetermined number of the training epochs, only after the performance of the time series forecasting model has been allowed to (i) initially improve and reach a local maximum performance and (ii) subsequently deteriorate and then improve again after reaching the local maximum performance.

2. The method according to claim 1, the training including, for each iteration of each of the training epochs:

determining at least one output of the time series forecasting model by providing at least one respective training sample from the training dataset as input to the time series forecasting model;

determining a training loss based on the at least one output; and refining the plurality of parameters of the time series forecasting model based on the training loss.

3. The method according to claim 2, the refining in each iteration of each of the training epochs further comprising:

refining the plurality of parameters of the time series forecasting model based on the training loss and a learning rate, wherein the learning rate decays from an initial learning rate as a function of a current training epoch until a predefined minimum learning rate is reached and stays constant at the predefined minimum learning rate after the predefined minimum learning rate is reached.

4. The method according to claim 3 further comprising:

setting the predefined minimum learning rate sufficiently high so as to enable the performance of the time series forecasting model to deteriorate and then improve again after reaching the local maximum performance.

5. The method according to claim 3, wherein the learning rate decays exponentially from the initial learning rate as a function of the current training epoch until the predefined minimum learning rate is reached.

6. The method according to claim 1 further comprising: setting the predetermined number of training epochs sufficiently high so as to enable the performance of the time series forecasting model to deteriorate and then improve again after reaching the local maximum performance.

7. The method according to claim 1 further comprising: setting a number of parameters in the plurality of parameters sufficiently high so as to enable the performance of the time series forecasting model to deteriorate and then improve again after reaching the local maximum performance.

8. The method according to claim 1 further comprising: setting a maximum number of training epochs of the training of sufficiently high so as to enable the performance of the time series forecasting model to deteriorate and then improve again after reaching the local maximum performance.

9. The method according to claim 1, wherein the training proceeds for a sufficient number of training epochs that, after initially improving and reaching the local maximum performance, the performance of the time series forecasting model is allowed to deteriorate by at least a predetermined amount and then improve again to reach a performance that exceeds the local maximum performance.

10. The method according to claim 1, wherein the time series forecasting model is configured to receive past values of a respective time series as input and determine predicted future values of the respective time series as output.

11. The method according to claim 1, wherein the time series forecasting model is neural network model.

12. The method according to claim 11, wherein the time series forecasting model has a Transformer-based architecture.

13. The method according to claim 1, the evaluating the performance of the time series forecasting model further comprising:

determining at least one further output of the time series forecasting model by providing at least one respective training sample from the testing dataset as input to the time series forecasting model; and determining a testing loss based on the at least one further output.

14. A non-transitory computer-readable medium that stores program instructions for training a deep learning-based time series forecasting model that, when executed by a processor, cause the processor to:

receive (i) a training dataset including a first plurality of time series data and (ii) a testing dataset including a second plurality of time series data;

train the time series forecasting model using the training dataset, the training taking place over multiple training epochs, the time series forecasting model having a plurality of parameters that are learned during the training;

periodically during the training, evaluate a performance of the time series forecasting model against the testing dataset; and end the training in response to the performance of the time series forecasting model not improving for a predetermined number of the training epochs, only after the performance of the time series forecasting model has been allowed to (i) initially improve and reach a local maximum performance and (ii) subsequently deteriorate and then improve again after reaching the local maximum performance.

15. A system for training a deep learning-based time series forecasting model, the system comprising:

a memory configured to store (i) a training dataset including a first plurality of time series data and (ii) a testing dataset including a second plurality of time series data; and a processor configured to:

train the time series forecasting model using the training dataset, the training taking place over multiple training epochs, the time series forecasting model having a plurality of parameters that are learned during the training;

periodically during the training, evaluate a performance of the time series forecasting model against the testing dataset; and end the training in response to the performance of the time series forecasting model not improving for a predetermined number of the training epochs, only after the performance of the time series forecasting model has been allowed to (i) initially improve and reach a local maximum performance and (ii) subsequently deteriorate and then improve again after reaching the local maximum performance.

* * * * *